Patented Oct. 24, 1950

2,527,304

UNITED STATES PATENT OFFICE 2,527,304

MANUFACTURE OF PENICILLIN

William J. Gilbert, Albion, Mich., assignor to Commercial Solvents Corporation, Terre Haute, Ind., a corporation of Maryland No Drawing. Application August 22, 1947, Serial No. 770,184

9 Claims. (Cl. 195—36)

This invention relates to manufacture of penicillin; and it comprises a process wherein penicillin is produced by propagating a penicillin-producing organism in a suitable aqueous fermentation medium containing a small amount, usually ranging from about 0.01 to 0.04 per cent by weight, of a halophenylacetamide sufficient to serve as an adjuvant, whereby the total production of penicillin is increased and a new halogen-containing penicillin product is produced which is soluble in chloroform and which has a B. subtilis/S. aureus assay ratio which is usually lower than that of previously known penicillin products. The invention also includes the new penicillin produced by the described process as a product, said product having a B. subtilis/S. aureus assay ratio ranging from about 0.57 to 0.75 and containing halogen in amount ranging from about 4.41 to 6.0 per cent by weight; all as more fully hereinafter set forth and as claimed.

The important antibiotic properties of penicillin were established a short time prior to the recent World War. The war greatly stimulated the demand for this material and its production in this country, starting soon after the commencement of the war, increased at a rate which was nothing short of phenomenal. This increase, aside from the building of additional production facilities, was the result of a large amount of concentrated research effort on new strains of mold, new fermentation media, new fermentation conditions, new recovery methods etc. Important improvements have been made in each of these factors the combination of which has made it possible to increase the output of penicillin in a given installation by many fold.

One of the early important discoveries involved the use of the so-called adjuvants. One of these discoveries was that the addition of what was assumed to be a precursor of penicillin, in small quantities to the fermentation medium would considerably increase the total production of penicillin. This discovery stimulated an intensive search for other chemicals which would have a similar or possibly a more advantageous effect upon penicillin production.

In the investigation which led up to the present invention considerably over 100 chemicals were tested for their effect upon penicillin fermentations and it was soon established that the structural formulae of the chemicals tested and their chemical relationships with other known adjuvants supply little if any information concerning the effectiveness of new and untested chemicals. In other words this art is strictly empirical.

One of the most important discoveries made during this investigation is that phenylacetamides which are substituted with halogen in the phenyl nucleus have a specific stimulating effect on penicillin production. The total resulting Oxford assay is increased substantially, this increase amounting to well over 300 per cent in the case of some strains of Penicillium notatum and Penicillium chrysogenum. And a new result is produced in that the penicillin produced in the process contains halogen. The halogen content in the penicillin product usually ranges from about 4.4 to 6.0 per cent by weight. Increased penicillin titers are produced both in synthetic and natural media.

It is quite possible that my new process produces a mixture of penicillins of differing structure one or more of which contains halogen in the molecule, most likely in a phenyl group, in addition to other penicillins which are normally formed. But to date I have not been able to separate such a halogen-containing penicillin from the product produced in my process. The indications are that if my product is a mixture of one or more of the known penicillins plus a proportion of a new halogen-containing penicillin, the latter must have a low B. subtilis/S. aureus assay ratio. This is deduced from the fact that the product itself has a ratio ranging from about 0.57 to 0.75 which is below that of the penicillins which are normally formed in the fermentation.

Any of the various procedures employed in conventional penicillin fermentation processes can be used in the production of my new product. This includes the conventional aseptic techniques, fermentation temperatures, rate of air flow through the mash, composition of the mash etc. as well as fermentation equipment. But I have found one critical factor, namely the concentration of the adjuvant in the mash. This concentration should be maintained between about 0.01 to 0.04 per cent by weight during the fermentation, if necessary by adding the adjuvant at intervals. If the concentration rises above about 0.03 per cent the production of penicillin starts to fall off and if it falls below about 0.015 per cent a similar decrease is noted. The optimum concentration appears to be about 0.02 per cent by weight.

I have found that the relative stimulation in penicillin production produced with one strain of Penicillium is, in general, much the same as that produced with other strains. The effect produced in fermentaion media of different types is also much the same although the indications are that increases in maximum titers are somewhat more marked in the case of some synthetic media than in corn steep water media.

My invention can be explained in more detail by reference to the following specific examples which represent practical operating embodiments of my process resulting in the production of my new penicillin.

Example I

A corn-steep water-lactose medium was used in this example consisting of 4.0 per cent steep water and 2 per cent lactose. This medium was brought to an initial pH of 5.7±0.1 by adding NaOH prior to sterilization. This medium was introduced into a fermentation vessel and sterilized for about 30 minutes. After cooling, the medium was inoculated by adding a culture prepared from spores of *Penicillium chrysogenum* introduced aseptically and 0.04 per cent by weight of p-chlorphenylacetamide was also introduced. The fermentation vessel containing the inoculated medium thus prepared was maintained at 24° C. and the medium aerated for a period of about 5 days. After completion of the fermentation, the medium was filtered to remove solid mold particles and the clear beer passed through a chemical extraction process to recover penicillin. The maximum penicillin titer on the beer was found to be 271 units per ml. In the absence of the adjuvant a maximum penicillin titer of 124 was obtained.

Example II

Medium of this same composition used in Example I was employed in this example and the same fermentation procedure was used except that 0.04 per cent of p-bromophenylacetamide was employed as adjuvant in place of the chloro derivative used in Example I. The maximum penicillin titer obtained in this example was 214.

Example III

The medium used in this example was of the same composition as that used in Example I and the same procedure was employed except that 0.02 per cent of p-iodophenylacetamide was used as adjuvant in place of the chloro derivative used in Example I. The maximum penicillin titer obtained was 263.

Example IV

In this example medium of the same composition as employed in Example I and the procedure employed was the same, including the use of 0.02 per cent of p-chlorophenylacetamide as adjuvant; but three different strains of *Penicillium chrysogenum* were used in three different tests for the inoculation of the media. Strain A gave an increase in maximum penicillin titer, over that produced in a control run without the adjuvant, amounting to 120 per cent. Strain B produced an increase of 86 per cent and strain C an increase of 208 per cent. The *B. subtilis/S. aureus* ratios obtained in the three tests were 0.57, 0.73 and 0.75, respectively.

Example V

In this example a series of comparative tests was run in a nutrient medium of the type described in Example I. The amount of p-chlorophenylacetamide used as adjuvant was varied from 0.02 to 0.04 per cent and two different strains of Penicillium were employed. In the case of one of the strains an increase over the control (without adjuvant) amounting to 84 per cent was obtained at an adjuvant concentration of 0.02 per cent whereas when the quantity of adjuvant employed was increased to 0.04 per cent the percentage increase dropped to 66 per cent. The second strain produced an increase of 126 per cent at a concentration of 0.02 per cent, which increase dropped to 77 per cent when the concentration of adjuvant was increased to 0.04 per cent by weight. These and other similar tests have established that a critical concentration of halophenylacetamide ranging from about 0.015 to 0.03 produces a maximum increase in maximum penicillin titers.

Example VI

In this example a synthetic fermentation medium was employed of the following composition:

| | |
|---|---|
| Lactose, 3.0% | $MgSO_4 \cdot 7H_2O$, 0.05% |
| Glucose, 0.5% | $FeSO_4 \cdot 7H_2O$, 0.02% |
| $NH_4NO_3$, 0.5% | $ZnSO_4 \cdot 7H_2O$, 0.002% |
| Acetic Acid, 0.6% | $CuSO_2 \cdot 5H_2O$, 0.0005% |
| $KH_2PO_4$, 0.2% | Tapwater to 70 ml. |

The pH of the above medium was brought to 5.9–6.0 by the addition of KOH. This medium was inoculated with a strain of *Penicillium notatum* and fermented in the manner described in Example I. In three comparative tests 0.01, 0.02 and 0.04 per cent by weight of p-chlorophenylacetamide were introduced. The increases in maximum penicillin titers produced in the first two tests were 243 and 358 per cent, respectively, while in the third test the maximum titer fell below that of the control test.

Example VII

Another series of comparative tests were made with a different synthetic medium having the following composition:

| | |
|---|---|
| $H_3PO_4$, 0.15% | Lactose, 2.0% |
| $MgSO_4 \cdot 7H_2O$ 0.025% | Glucose, 0.5% |
| $FeSO_4 \cdot 7H_2O$, 0.02% | $NH_4NO_3$, 0.5% |
| $ZnSO_4 \cdot 7H_2O$, 0.003% | $CH_3COOH$, 0.5% |
| $CuSO_4 \cdot 7H_2O$, 0.0005% | Tapwater to 150 ml. |

This medium was brought to a pH of 5.7–5.8 by the addition of KOH. Two different strains of Penicillium (X–1612 and R13.955152) were employed which were developed from corn-flask spores on a steep water-lactose medium over a period of 18 hours. Fermentations were conducted as described in Example I. In two of the tests 0.02 per cent of a mixture of p- and o-chlorophenylacetamides and in two other tests 0.04 of the same mixture was used as adjuvant. In the two tests using 0.02 per cent of adjuvant increases in maximum penicillin titers amounting to 306 and 139 per cent over the controls were obtained, while in the two comparative tests using 0.04 per cent of adjuvant corresponding values of 130 and 112 per cent, respectively, were obtained.

Tests similar to the above have shown that very similar results are produced with the corresponding ortho-halophenylacetamides and with 2,4-dihalophenylacetamides. It is therefore evident that the benefits of the present invention can be secured when any of the halophenylacetamides, whose phenyl nuclei are substituted in at least one of the positions 2 and 4 with a halogen atom, are used as adjuvants in the fermentation of penicillin-producing molds.

While I have described what I consider to be the most advantageous modifications of my process, it is evident of course that various modifications can be made in the specific procedures which have been described without departing from the purview of this invention. Thus it is evident that it is possible to employ any of the conventional fermentation media which have heretofore been used in the manufacture of penicillin, as well as other conventional procedures which have been developed for promoting the formation of penicillin, in connection with the use of any of my halophenylacetamides as adjuvants. While clinical tests made with my new chlorine-containing penicillin have not yet been completed, they indicate that the therapeutic properties of this material are quite similar to those of the penicillins which have been produced previously. Other modifications of the present invention which fall within the scope of the following claims will be immediately evident to those skilled in this art.

What I claim is:

1. In the manufacture of penicillin, the process which comprises fermenting an aqueous nutrient medium with a penicillin-producing mold, stimulating penicillin production by maintaining in said nutrient medium during the fermentation a small concentration, ranging from about 0.01 to 0.04 per cent by weight, of a halophenylacetamide the phenyl-nucleus of which is halogen-substituted in at least one of positions 2 and 4, and recovering the penicillin thereby produced.

2. In the manufacture of penicillin, the process which comprises adding to an aqueous nutrient medium from about 0.01 to 0.04 per cent by weight of a p-halophenylacetamide, fermenting the medium with a penicillin-producing mold and recovering the penicillin thereby produced.

3. The process of claim 2 wherein the p-halophenylacetamide is p-chlorophenylacetamide.

4. The process of claim 2 wherein the p-halophenylacetamide is p-bromophenylacetamide.

5. The process of claim 2 wherein the p-halophenylacetamide is p-iodophenylacetamide.

6. In the manufacture of penicillin, the process which comprises incorporating in an aqueous nutrient medium from about 0.015 to 0.03 per cent by weight of a halophenylacetamide whose phenyl nucleus is substituted with halogen in at least one of positions 2 and 4, and recovering the penicillin thereby produced.

7. The process of claim 6 wherein said halophenylacetamide is p-chlorophenylacetamide.

8. The process of claim 6 wherein said halophenylacetamide is o-chlorophenylacetamide.

9. The process of claim 6 wherein a mixture of para- and ortho-chlorophenylacetamides is employed.

WILLIAM J. GILBERT.

REFERENCES CITED

The following references are of record in the file of this patent:

UNITED STATES PATENTS

| Number | Name | Date |
|---|---|---|
| 2,423,873 | Coghill | July 15, 1947 |

FOREIGN PATENTS

| Number | Country | Date |
|---|---|---|
| R.P. 21,793 | Cuba | Nov. 30, 1946 |

OTHER REFERENCES

Lilly: Reports on Penicillin L 26, pp. 6, 16; L 27, p. 7; L 28, pp. 9, 10; L 29, pp. 3, 4; L 30, pp. 2, 3, 5.

Penicillin Interim Report 45-130, O.P.R.D., War Production Board, Contract WPB-126. The Pennsylvania State College, 9/10/45, page 3.